United States Patent Office 3,443,655
Patented May 13, 1969

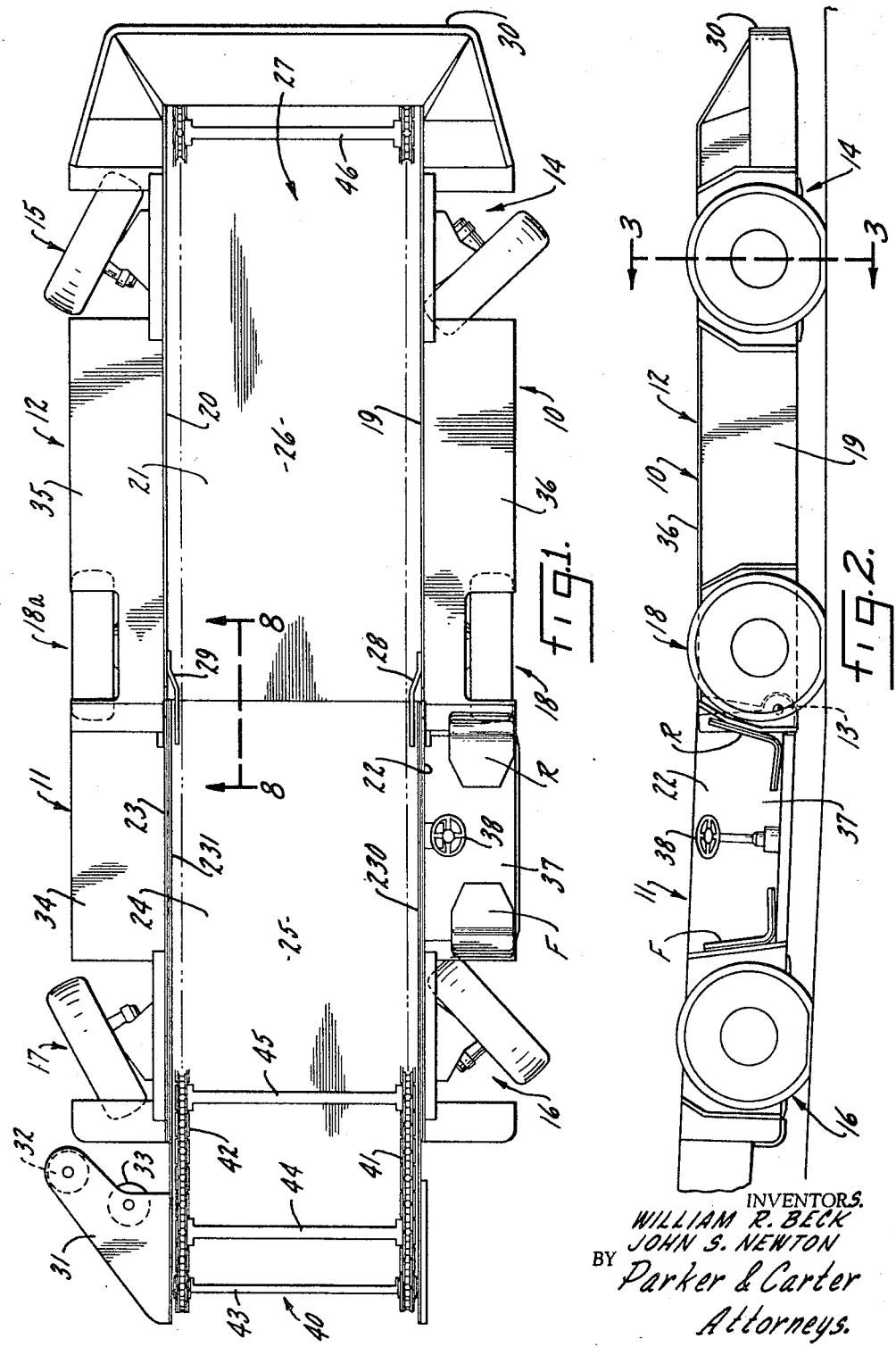

3,443,655
MOTORIZED WHEEL ASSEMBLY
William R. Beck, Palos Heights, and John S. Newton, Glen Ellyn, Ill., assignors, by mesne assignments, to Westinghouse Air Brake Company, Pittsburgh, Pa., a corporation of Pennsylvania
Original application Nov. 19, 1963, Ser. No. 324,732, now Patent No. 3,302,739, dated Feb. 7, 1967. Divided and this application Aug. 8, 1966, Ser. No. 571,007
Int. Cl. B60k 1/00; B62d 7/00
U.S. Cl. 180—65                                6 Claims

ABSTRACT OF THE DISCLOSURE

A standardized motorized wheel assembly for a vehicle such as a mine shuttle car which can be used with only minor attachment variations as either a steering wheel or a fixed wheel whereby a single wheel assembly may function as a spare wheel assembly for a 6 wheel car, the wheel assembly being relatively light weight due to use of the motor housing as a load transferral member, and easily disassembled for repair and maintenance.

---

This application is a division of our copending application Ser. No. 324,732 filed Nov. 19, 1963, now Patent No. 3,302,739.

This invention relates generally to haulage vehicles and a motorized wheel assembly, and specifically to a shuttle car especially adapted for use in underground mines.

Self-powered haulage vehicles have been known for a good many years. Commercially practical six wheel self-powered haulage vehicles are a relatively recent innovation however. The six wheel type of haulage vehicle, which is commonly known in the underground mining trade as a shuttle car, consists of a body which is articulated at or near its midpoint so that the car can maintain traction on uneven surfaces. Generally three pairs of wheels are employed, one pair at each end of the car and one pair at or adjacent the pivot point between the articulated body sections. The body sections form a trough which is generally open at each end. Material which is loaded into the trough or carrying chamber is discharged therefrom at a discharge point by an endless flight conveyor which moves over the load supporting surface on the bottom of the trough.

Accordingly, a primary object is to provide a motorized wheel assembly especially adapted for use in a shuttle car, although it may be easily adaptable to any machine requiring a motorized wheel, in which the wheel housing functions as a load carrying member thereby eliminating additional load carrying elements and reducing the overall weight of the car.

Yet a further object is to provide a motorized wheel assembly especially adapted for a shuttle car in which a motor shell or housing functions as a connecting link in a steering linkage thereby reducing the cost of the car, complexity of the steering linkage, and reducing the overall weight of the car.

Yet a further object is to provide a shuttle car having a plurality of motorized wheels, each wheel housing functioning as a wheel load carrying member, which is lower in cost, simpler, and has a greater live load to dead weight ratio than existing six wheel shuttle cars.

Another object is to provide a motorized wheel for use under rugged operating conditions in which the motor drive shaft is flexibly mounted to the motor to thereby accommodate maximum misalignment between the first stage wheel gearing and motor pinion.

Yet a further object is to provide a motorized wheel assembly for use under rugged operating conditions in which the wheel gearing is floatable with respect to the wheel center and the motor drive shaft to thereby provide even load distribution, and even wear and long life of the gearing.

A further object is to provide a motorized wheel assembly in which the floating wheel power gearing is driven by a flexibility mounted motor drive shaft to thereby provide maximum shock absorption capabilities.

Yet a further object is to provide a shuttle car in which the same motorized wheel unit may be employed for each wheel, thereby reducing to one the number of spare wheel units needed to keep the car in continuous operation.

A further object is to provide a motorized wheel assembly in which a centered, driven gear element is floatably mounted in both radial and longitudinal directions so as to be able to freely seek its own center when in engagement with a plurality of driven gear elements.

Yet a further object is to provide a motorized wheel assembly consisting of a motor and a wheel, said motor having a power output shaft connected to the motor intermediate the ends of the motor armature to thereby provide excellent flexibility to the shaft in conjunction with controlled torsional stress.

Other objects and advantages of the invention will become apparent upon a reading of the following description of the invention.

The invention is illustrated more or less diagrammatically in the accompanying drawings wherein:

FIUGRE 1 is a top plan view of the shuttle car showing the steerable wheels in a maximum turn position;

FIGURE 2 is a side elevation of the shuttle car;

Like reference numerals will be used to refer to like parts in separate figures throughout the following description of the drawings.

Body structure

Figure 3:
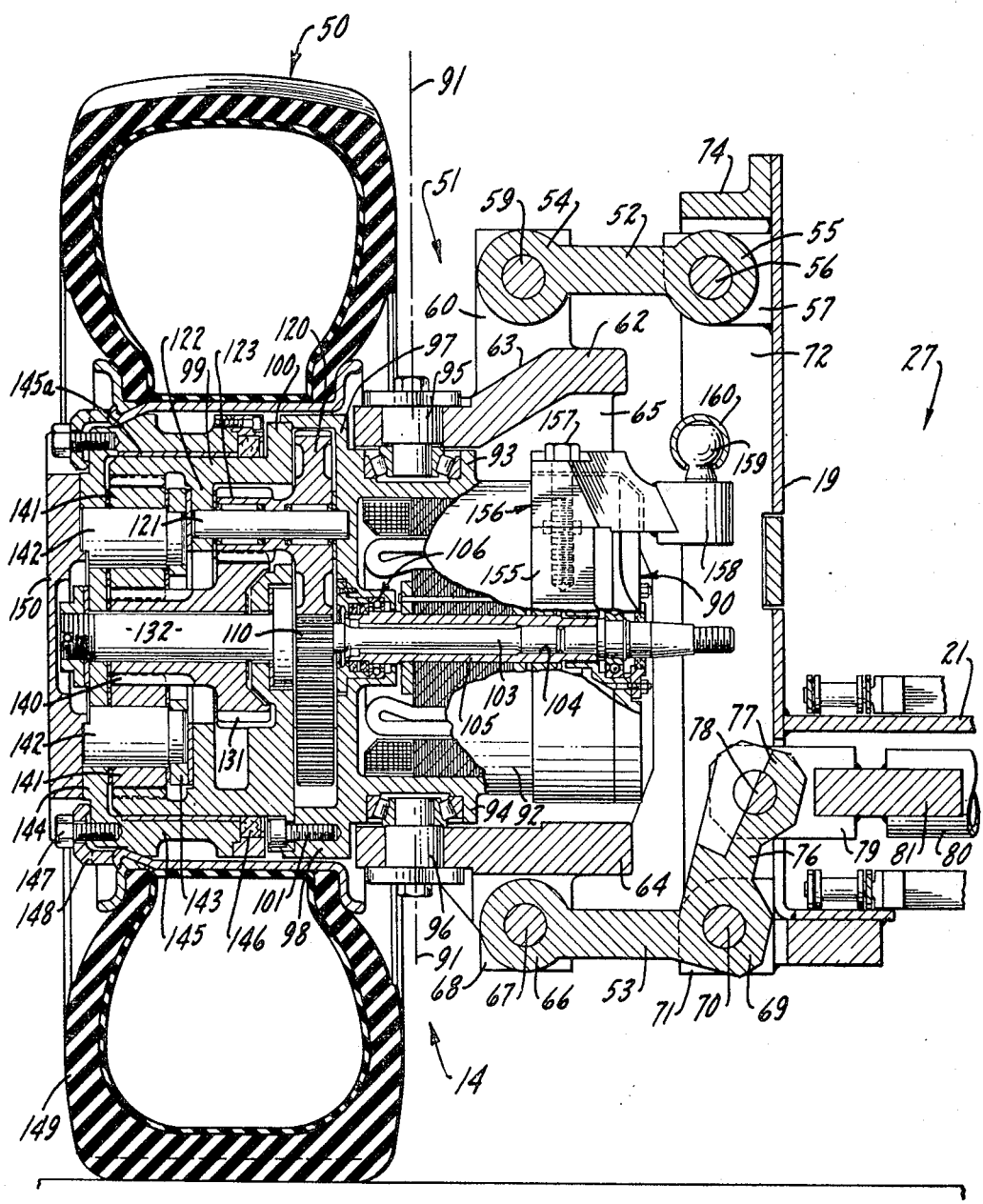
FIGURE 3 is a section through a motorized wheel assembly taken substantially along the line 3—3 of FIGURE 2.

The shuttle car is indicated generally at 10 in FIGURES 1 and 2. It consists essentially of a pair of body sections 11 and 12 which are articulately connected to one another for flexing movement in a generally vertical plane about a common pivot 13, seen best in FIGURES 6-8. A set of steerable wheel assemblies 14 and 15 are located at the forward or front end of the body, in this instance body section 12. A second set of steerable wheel assemblies 16 and 17 are located at the rear of the body. A third set of wheel assemblies 18 and 18a are located at the approximate midpoint of the body, the mid set of wheels being nonsteerable.

It should be understood that although a pair of wheels is shown as comprising each set, the term "set" is not confined to such an arrangement. It is entirely possible that each wheel assembly may include two or even more tires. The provision of additional wheels might be particularly desirable when the car is intended for operation on soft bottoms. The principles of operation and the description of the invention can be most easily described by a showing of only a single wheel associated with each assembly, and for this reason only one wheel per each wheel assembly has been shown. Likewise, although the center set of wheel assemblies 18 and 18a have been shown as located off-center from the pivot means 13 it is entirely possible that this set of wheel assemblies could be located at any desired position intermediate the end set of wheels. The center set might, for example, under certain conditions, be located in axial alignment with the pivot means or pivot shaft 13. It is contemplated however that it will be most advantageous to offset the center set of wheels from the pivot means since this generally results in a considerably simpler structure and better space utilization.

Front loading body section 12 includes a pair of generally vertical, parallel side walls 19 and 20 which are welded or otherwise suitably secured to a bottom plate or wall 21. Rear or discharge body section 11 includes a pair of outer side walls 22 and 23, and a pair of inner load contacting side walls 230 and 231 which are welded or otherwise suitably secured to a bottom plate or wall 24. The load contacting walls and bottom plates of body sections 11 and 12 form generally U-shaped material carrying chambers 25 and 26 respectively, the chambers together forming an elongated, articulated, generally U-shaped carrying trough 27. A pair of offset overlap plates 28 and 29 are welded to walls 19 and 20 of forward section 12 respectively and extend rearwardly past the area of overlap of the body sections. The overlap plates are welded to the upstream end of the carrying chamber 26 so that material, such as coal, when moved rearwardly by the flight conveyor 40 will be deflected away from the overlap area between the sections thus eliminating a major source of clogging between the sections. The terms "upstream" and "downstream" in this application are used in the context of the normal direction of flow of material through the body, which is from right to left as viewed in FIGURES 1 and 2.

A bumper structure 30 extends about the forward end of the car. A cable reel mounting bracket 31 extends outwardly from one of the rear sides of the car, preferably the side opposite the driver's side. The bracket carries a plurality of cable sheaves 32 and 33 and any suitable pay out and take up mechanism for electrical power cable. A plurality of side plates 34, 35, 36 extend outwardly from the side walls 23, 20 and 19 to shield operating components which are located along the sides of the car. An operator's compartment is indicated at 37, the compartment including a steering wheel 38 and a pair of seats F and R, one facing forwardly and the other rearwardly.

An endless slat conveyor, indicated generally at 40, traverses the length of the carrying trough 27. The conveyor consists essentially of a pair of link chains 41, 42 which move slats 43, 44, 45 and 46 over the bottom of the carrying trough.

*Wheel assembly and equalizer system*

Figure 4:
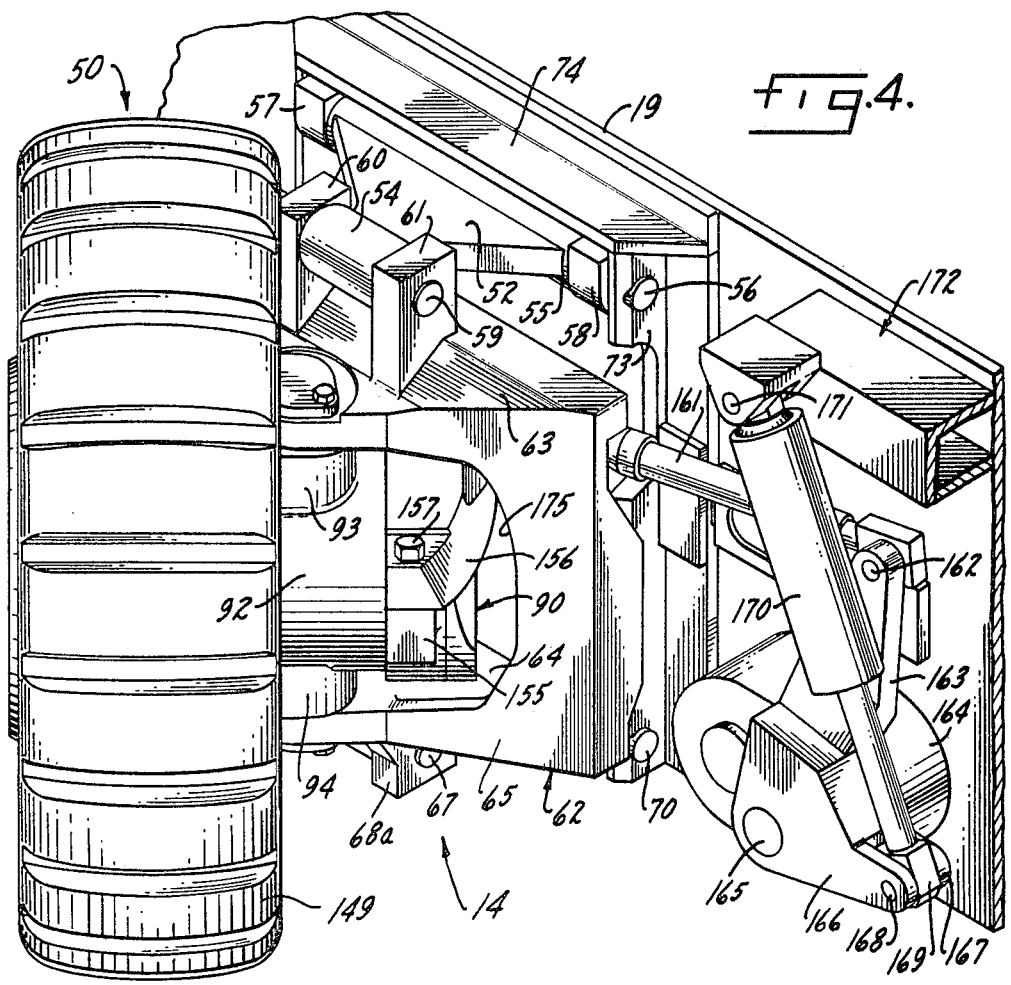
FIGURE 4 is a perspective view with parts broken away and others omitted for clarity of the right front wheel of the shuttle car of FIGURE 1 in a turn position.
Figure 5:
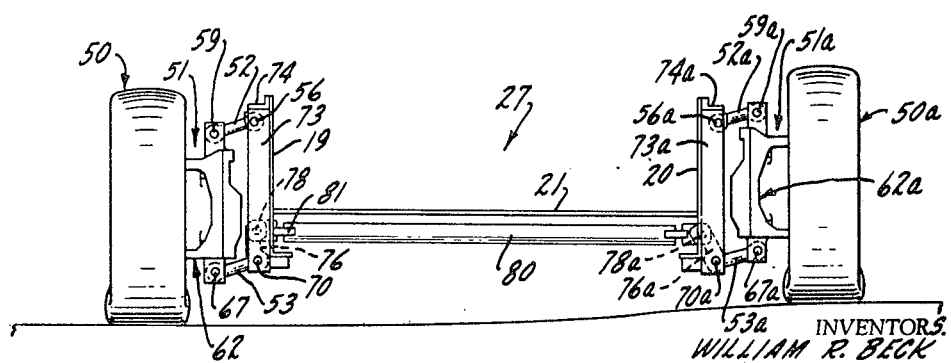
FIGURE 5 is a view of the equalizer system associated with a set of wheels.

Steerable wheel assembly 14 and its associated equalizer system is shown best in FIGURES 3, 4 and 5. The wheel assembly consists essentially of a wheel 50 and a motor unit 51, the motor unit 51 forming a load carrying portion of the equalizer system.

*Equalizer system*

Each wheel assembly is supported from and connected to the body frame by a parallelogram linkage which comprises a portion of the equalizer system for a set of oppositely spaced wheel assemblies. Referring particularly to FIGURE 3, the parallelogram linkage supporting wheel assembly 14 includes a pair of short upper and lower links 52 and 53. Link 52 is a generally triangularly shaped plate, shown best in FIGURE 4, which terminates at its outer end in a bearing sleeve 54 and at its inner end in a similar, longer bearing sleeve 55. Inner bearing sleeve 55 pivots about a pin 56 which is journaled in a pair of supporting brackets 57 and 58, see FIGURE 4, which are welded or otherwise suitably secured to side wall 19. The outer bearing sleeve 54 pivotally receives the pivot pin 59 which is journaled at its ends in a pair of brackets 60, 61, the brackets extending upwardly from wheel carrier 62. The wheel carrier is essentially a triangularly shaped housing having an offset upper wall 63, a substantially planar lower wall 64 and tapered cut away exterior side walls 65, the exterior walls forming the apex of a roughly isosceles triangle in plan view.

Lower link 53, which may likewise be generally triangularly shaped, terminates at its outer end in a bearing sleeve 66 which receives a pivot pin 67. Pivot pin 67 is journaled in a pair of brackets 68, 68a which project downwardly from the bottom wall of wheel carrier 62.

The inner end of bottom link 53 terminates in a bearing sleeve 69 within which is pivot pin 70. Pivot pin 70 is journaled at its ends in a pair of flanges, only one of which, 71, is visible from FIGURES 3 and 4.

A housing consisting of outwardly extending plates 72, 73 and a top plate 74 covers the inner ends of the short links including the pivot pins 56 and 70. Pins 56 and 70 may additionally be journaled in the housing side walls 72 and 73, if desired, as best seen in FIGURE 4.

The lower short link 53 is actually one arm of a bell crank lever, the other arm of which is indicated at 76. The upper end or arm 76 terminates in a journaled bearing 77 which receives a pivot pin 78. The pin in turn is received in a pair of brackets which slide through a cut away area in side wall 19. Pin 78 may be integral or rotatable with respect to its supporting lugs 79. A rigid spacer member 80 is rigidly secured to lug 79 by a rigid welded connector 81 or any other suitable means which will maintain the centers of pins 78 and 78a of FIGURE 5 a fixed distance apart at all times. Referring to FIGURE 5, those parts on the right hand wheel assembly which correspond to similar parts in the left hand assembly are indicated by the corresponding reference numerals with the subscript *a*.

It will be noted that the parallelogram linkages are composed of links, the corresponding links being identical in length and spatial relation to corresponding areas. Short link 52 is equal in length to link 52a and long link 72 is identical in length to long link 72a and so forth. It should also be understood that when referring to the lengths of the links, the end reference points are the center axes of the pivot pins 56, 59, 67 and 70. For convenience of further description the physical pins and their geometrical axes will hereafter be referred to by the same reference numerals.

*Motor*

Referring now to FIGURES 3 and 4 particularly, the motor housing and its associated structure connecting it to the parallelogram equalizer linkage will next be described.

The motor 90 is connected to the wheel carrier 62 for rotation about a generally upright axis 91. The motor includes a housing 92 within which are located the conventionally arranged windings. Upper and lower generally circular flanges 93 and 94 receive tapered roller bearings within which are journaled a pair of king pins 95 and 96. The king pins are axially aligned one with the other and are secured to the upper and lower walls of the wheel carrier by bolts, not numbered. Preferably the king pins are formed with an outer, generally elliptical shaped overhanging cover, a first stub section which is rotatably received in an aperture in the upper and lower carrier walls, and an inner, reduced diameter stub section which is received within the tapered roller bearings. Alternately, the king pins may be formed of individual parts and connected together but in any event they are of substantial diameter and axially aligned with one another.

The motor housing 92 further includes a flange 97 which terminates in a longitudinally axized skirt 98. Flange 97 extends both radially inwardly and outwardly a substantial distance from the motor shell 92. A spindle 99, having a flange 100, is bolted as at 101 to skirt 98. The spindle supports the wheel 50 and contains the gearing for the wheel, as will shortly be described.

Motor 90 includes a flexibly mounted wheel drive shaft 103 which is shrink fitted, as at 104, to a center, rotatable shaft housing 105 within the motor, the shaft housing carrying the inner winding of the motor. The outer end of the shaft housing is journaled in a suitable bearing indicated generally at 106, the bearing being retained in an oil tight circular housing projecting in an inward direction from motor housing flange 97. A drive pinion 110 is mounted on the outer end of the flexible shaft 103.

For convenience of description, the terms "inner" and "outer" refer to directions determined by looking toward the longitudinal center of the car and outwardly therefrom respectively.

Wheel

The driving gear for wheel 50 comprises a primary reduction gearing system, a secondary reduction gearing system, and a planetary gear system.

The primary reduction gearing system includes three reduction gears 120 spaced equidistantly from one another about motor drive pinion 110. Each of the reduction gears 120 is mounted on a shaft 121, the inner end of which is supported by the motor housing flange 97 and the outer end of which is supported in an internal flange 122 projecting radially inwardly from spindle or motor housing extension 99.

The secondary reduction gearing comprises three pinions 123, each of which is integral with an associated primary reduction gear 120. The pinions are meshed with a central gear 131 which turns about a main assembly bolt 132. Central gear 131 is free to float axially back and forth a slight distance between end thrust bearings which encircle the main assembly bolt 132. The thrust bearings throughout the wheel gearing are not numbered for purposes of clarity. The central gear is likewise free to rotate about the main assembly bolt 132 without contacting it, for there is a slight clearance between the bolt and the internal surface of gear 131. In other words, central gear 131 is floatably mounted both longitudinally and in all radial directions within limits. The longitudinal float is sufficient to enable the gear to center itself within three pinions 123 and within the planet gears of the planetary system which will next be described.

The planetary system comprises a sun gear 140 which is integral with central gear 131 and accordingly floatable with gear 131. Four planet gears 141, each of which is mounted on a stub shaft 142, rotate about the sun gear 140. The inner ends of the stub shafts are journaled in a suitably apertured bearing ring or plate 143 and the outer ends are journaled in wheel hub 144.

Wheel hub 144 is a generally cup-shaped member, the longitudinal portion 145 of which extends inwardly to a seal 146. The wheel hub rotates about a sleeve bearing 145a which encircles the spindle 99.

The wheel hub 144 is connected by bolts 147 to a bearing ring 148 upon which is mounted the inflatable pneumatic tire 149. A wheel cover 150 is secured by bolts or any other suitable means to the wheel hub 144 and is rotatable therewith. Wheel cover 150 may be plugged at one or a plurality of locations to thereby drain lubricant from the gearing system. It will be understood that the gears rotate in a bath of oil, the bath extending from the wheel cover 150 inwardly to the shrink fitted area 104 of the motor power shaft.

A pair of ears 155 extend outwardly from the upper, inner end of the motor housing 92. A steering arm 156 is bolted to the ears by bolts 157. The arm carries, at its inner end, an extension 158 from which a steering ball 159 projects upwardly. A ball socket end 160, carried at the end of a steering drag link 161, shown best in FIGURE 4, is fitted about the steering ball 159. The outer end of the drag link 161 is pivotally connected by a pin 162 to an extension 163 from a gear housing 164. Extension 163 and that portion of the gearing in housing 164 to which it is connected may be pivotable with shaft 165. A pair of pivot ears 166 and 167 extend outwardly from the gear housing 164 and carry a pivot pin 168 to which is pivotally attached the outer end of piston rod 169 of hydraulic cylinder 170. The upper end of the cylinder is pivotally connected, as at 171, to supporting structure indicated generally at 172. Rotation of steering wheel 38 by the operator will, through a suitable steering linkage, cause rotation of the gears in housing 164. Rotation of the gears in housing 164 rotates extension 163, and with it drag link 161. Movement of drag link 161 swings the entire wheel assembly about axis 91 and king pins 95 and 96. Each of the side plates 65 of wheel carrier 62 is cut away, as at 175, to enable the motor to swing freely about king pins 95 and 96.

Only enough steering linkage has been illustrated and described to make clear the support and mode of operation of the wheel assembly. The specific steering linkage illustrated does not, by itself, comprise the presently disclosed invention. It may advantageously be a system similar to that disclosed and claimed in copending application Ser. No. 324,770, filed Nov. 19, 1963 by William G. Bunchak, now Patent 3,314,690, issued Apr. 18, 1967, which application is assigned to the assignee of this application.

Use and operation

The use and operation of the invention are as follows:

In operation, the operator controls steering wheel 38 from forwardly facing seat F. As the car traverses the floor, any vertical irregularities in a longitudinal direction are compensated for by pivoting movement of the forward body section 12 about the axis of pivot shaft 13 with respect to rearward body section 11.

When the operator turns wheel 38 to steer the car, steering linkage transmits the steering impulse forwardly or rearwardly, as the case may be, and this shifted position is reflected in an appropriate forward or backward movement of link 161 of FIGURE 4. The terminal end 160 of link 161 is connected to steering ball 159 which in turn is integral with motor assembly 51 and wheel assembly 50. Movement of the steering ball 159 rotates the motor, and thereby the wheel, about king pins 95 and 96. Flexible power lines leading to motor 90 enable the motor to swing freely without the use of any complicated linkage movement accommodating connections which otherwise would be necessary when the power source for the wheels is located adjacent the center of the car.

The wheel drive end 103 of the motor power shaft terminates in a radially floatable drive pinion 110 by virtue of the connection of the inner end of the flexible drive shaft to a central housing 105 intermediate the ends of the motor armature. Power from pinion 110 is transmitted to tire 149 through primary reduction gears 120, secondary reduction gears 123, and the planet gear system 140 and 141. Sun gear 140 is longitudinally and radially floatably mounted with respect to the axis of the motor housing so that the wheel can actually wobble in all directions without causing undue stresses in the motor drive shaft. At the same time, load is transferred through the king pins and the motor housing to the wheels since the motor extension 99 is in effect integral with the motor housing 92 through which the load is transferred.

We claim:

1. A wheel motor assembly, said wheel motor assembly including, in combination, a motor, said motor having a flexibly supported power shaft extending outwardly therefrom, said shaft having a power output end, a wheel, wheel drive gearing carried by and rotatable with the wheel, and means for drivingly connecting the flexibly supported power shaft to the wheel drive gearing, said means including a gear element floatably supported both longitudinally and radially in operative driving engagement with both the wheel drive gearing and the flexibly supported power shaft, said floatably supported gear element having a power input end connected to the output end of the flexibly supported shaft by a speed reducing gear train, said gear train including a plurality of bearing mounted load distributing gears, said gear train distributing gears being mounted on axes fixed with respect to the motor housing.

2. In combination, a wheel assembly, a load carrying motor assembly, said motor assembly including motor means, a motor housing therefor, and a load receiving and transmitting structure projecting longitudinally outwardly beyond the motor means, at least a portion of said load receiving and transmitting structure being disposed in generally vertically aligned load transferral relationship to the wheel assembly, said motor housing having bearing means carried thereby in substantially vertical alignment with the motor means for pivotally connecting the wheel assembly and the motor assembly to a base structure, said motor means being located substantially entirely inwardly from the wheel assembly, and bearing means between the wheel assembly and the load receiving and transmitting structure of the motor assembly.

3. The combination of claim 2 further characterized in that the bearing means comprises a sleeve bearing.

4. The combination of claim 2 further characterized in that at least a portion of the load receiving and transmitting structure lies vertically within the wheel assembly whereby wheel assembly loads may be transferred generally vertically between the wheel assembly and the load receiving structure.

5. The combination of claim 4 further characterized firstly, in that the overlapping transferral area formed between the load receiving and transmitting structure and the wheel assembly is circular in outline and disposed about an axis which is coincident with the axes of the motor assembly and the wheel assembly, and secondly, in that the bearing means is a sleeve bearing.

6. The combination of claim 5 further characterized in that the load receiving and transmitting structure is disposed radially within the load transferral area of the wheel assembly whereby load transferral from the wheel assembly to the load receiving structure is in a radially inward direction.

References Cited

UNITED STATES PATENTS

| | | | |
|---|---|---|---|
| 1,417,798 | 5/1922 | Cook et al. | |
| 2,258,328 | 10/1941 | Lee et al. | 180—65 X |
| 2,430,528 | 11/1947 | Moon | 180—66 X |
| 2,726,726 | 12/1955 | Le Tourneau | 180—10 |
| 2,899,005 | 8/1959 | Speicher | 180—10 |
| 3,055,448 | 9/1962 | Fagel | 180—10 |

BENJAMIN HERSH, *Primary Examiner.*

MILTON L. SMITH, *Assistant Examiner.*

U.S. Cl. X.R.

180—10, 43